(12) United States Patent
Brisbois et al.

(10) Patent No.: US 7,854,096 B2
(45) Date of Patent: Dec. 21, 2010

(54) DOOR PROTECTIVE COVER

(76) Inventors: Michael B. Brisbois, 6181 S. Forest Ct., Littleton, CO (US) 80121; Richard A. Brisbois, 6612 Trail Bluff Dr., Plano, TX (US) 75024; Kenneth W. House, 2531 Newport Dr., Fort Collins, CO (US) 80526; Douglas P Collins, 496 Mesa Ave., Loveland, CO (US) 80537

( * ) Notice: Subject to any disclaimer, the term of this patent is extended or adjusted under 35 U.S.C. 154(b) by 401 days.

(21) Appl. No.: 12/057,669

(22) Filed: Mar. 28, 2008

(65) Prior Publication Data

US 2008/0172949 A1 Jul. 24, 2008

Related U.S. Application Data

(63) Continuation-in-part of application No. 11/566,096, filed on Dec. 1, 2006, now Pat. No. 7,448,173.

(51) Int. Cl.
| | |
|---|---|
| E04C 2/52 | (2006.01) |
| E04B 2/00 | (2006.01) |
| F16B 7/08 | (2006.01) |
| F16B 1/00 | (2006.01) |

(52) U.S. Cl. .................... 52/202; 52/584.1; 403/187; 403/188; 248/228.1

(58) Field of Classification Search ............... 52/202, 52/203, 2.11, 2.12, 2.19, 2.25, 2.26, 3, 5, 52/173.2, 211, DIG. 12, DIG. 14
See application file for complete search history.

(56) References Cited

U.S. PATENT DOCUMENTS

| | | | |
|---|---|---|---|
| 2,757,854 A | 8/1956 | Wall | |
| 4,372,364 A | 2/1983 | Katz | |
| 4,884,687 A | 12/1989 | Steves | |
| 5,042,656 A | 8/1991 | Kahre | |
| 5,103,593 A | 4/1992 | McNaughton | |
| 5,255,727 A | 10/1993 | Saruwatari et al. | |
| 5,351,733 A | 10/1994 | Ullman | |
| 5,799,443 A | 9/1998 | Koeniguer | |
| 6,029,409 A | 2/2000 | Wilson | |
| 6,029,410 A | 2/2000 | Westberg | |
| 6,128,862 A * | 10/2000 | Katz | 52/2.11 |
| 6,308,474 B1 | 10/2001 | Wilson | |
| 6,381,910 B1 | 5/2002 | Katz | |
| 6,526,708 B1 * | 3/2003 | Hartley et al. | 52/211 |
| 6,684,572 B2 * | 2/2004 | Homolka et al. | 49/462 |
| 6,703,102 B1 | 3/2004 | Prescott | |
| 6,826,877 B1 * | 12/2004 | Stradel | 52/211 |
| D582,052 S * | 12/2008 | Borland | D25/53 |

* cited by examiner

*Primary Examiner*—Richard E Chilcot, Jr.
*Assistant Examiner*—Mark R Wendell
(74) *Attorney, Agent, or Firm*—Kurt Leyendecker; Leyendecker and Lemire LLC

(57) ABSTRACT

Embodiments of door protectors are described. One typical embodiment comprises front and rear corrugated cardboard panels that are draped over a door by way of one or more pieces of saddle tape that join the panels along their respective top edges. A plurality of folds, perforations and cutouts are provided on the faces of the panels to permit access to the door's hardware. Accordingly, the door can be operated in a traditional manner while providing impact and damage protection to the door. The panels include a plurality of widthwise folds that permit the door protector to be folded for transport and storage. In variations, the edge straps are provided often comprised of hook and loop material to both secure the protector in a folded configuration and to an associated door.

14 Claims, 13 Drawing Sheets

DOOR PROTECTIVE COVER

RELATED APPLICATIONS

This application is related to: (i) U.S. patent application Ser. No. 11/566,096 filed on May 30, 2007 also entitled Door Protective Cover and (ii) U.S. patent application 12/058,093 filed concurrently herewith entitled "Door Edge Protectors for use in Conjunction with a Door Protective Cover", both and having at least one common inventor with the present application. The foregoing applications are incorporated herein in their entirety by reference.

FIELD OF THE INVENTION

The present invention pertains generally to covers for protecting doors from damage.

BACKGROUND

The substantially planer front and rear surfaces of interior and exterior doors of offices, other commercial buildings and even residences are vulnerable to damage during movement and installation, construction, remodeling and painting. For instance, in an office environment undergoing interior construction followed by the move in of new tenants, the associated doors can be at risk of damage for extended periods of time from a few days to several weeks or months.

It is known to cover doors with blankets that may or may not be padded. However, blankets hung over a door are often too short to protect an entire side thereof and are prone to sliding off of the door.

Several door protectors are known in the art including those taught in U.S. patents: U.S. Pat. Nos. 5,255,727 ('727); 4,372,364 ('364); 5,351,733 ('733); and 6,029,409 ('409). The cover taught in the '727 patent is comprised of a fabric material that typically includes an interior panel or padding layer. Velcro material is provided to secure the cover in place on a door. Further, cutouts are provided to permit operation of the underlying door while covered. The construction of the '727 cover and its inherent cost of production precludes it use as a disposable thereby requiring storage between uses. Since the cover is intended to be reusable; however, its configuration and size make its storage inconvenient and inefficient.

The door protective device of U.S. Pat. No. 5,351,733 is typically comprised of a padded cloth material and includes several elastic and fabric straps. Like the cover of the '727 patent, it is not intended to be disposable given the inherent cost of fabrication. The '727 protective device covers substantially the entirety of an associated door and, as such, effectively prevents usage of the door when covered. Further, the padded cloth material taught in this patent is unlikely to provide much impact protection save for very light incidental impacts.

The door protector taught in the U.S. Pat. No. 4,372,364 is also made of a cloth material and typically includes cotton padding to provide some impact protection. Velcro material is also sewn to the protector. Given the protector's construction and its inherent cost of fabrication, it is not considered disposable and therefore must be stored when not in use. Further, the '364 protector only covers a single side of a door and is therefore not suitable in environments where the door may be damaged on the uncovered back side. Furthermore, the protector covers the door handle on the covered side making the use of the handle more difficult.

The doorway shield taught in U.S. Pat. No. 6,029,409 is also designed to cover only a single side of an associated door. Additionally, the '409 shield covers hinged interface and adjacent doorjamb. The sheet material comprising the shield is preferably semi-rigid but resilient permitting bending to hook over the door. The preferred sheet material comprises 20-30 mil thick polyethylene sheeting backed by $\frac{1}{6}$-$\frac{1}{4}$" thick polyethylene foam. The thickness of the sheet and foam along with the shield's configuration are necessary for the proper operation of the shield as taught in the '409 patent; however, its thickness also prevents it from being foldable for storage and transport. Additionally, like the cover of the '364 patent, the '409 shield both only protects a single side of a door and covers the door handle.

DETAILED DESCRIPTION

Figure 1:
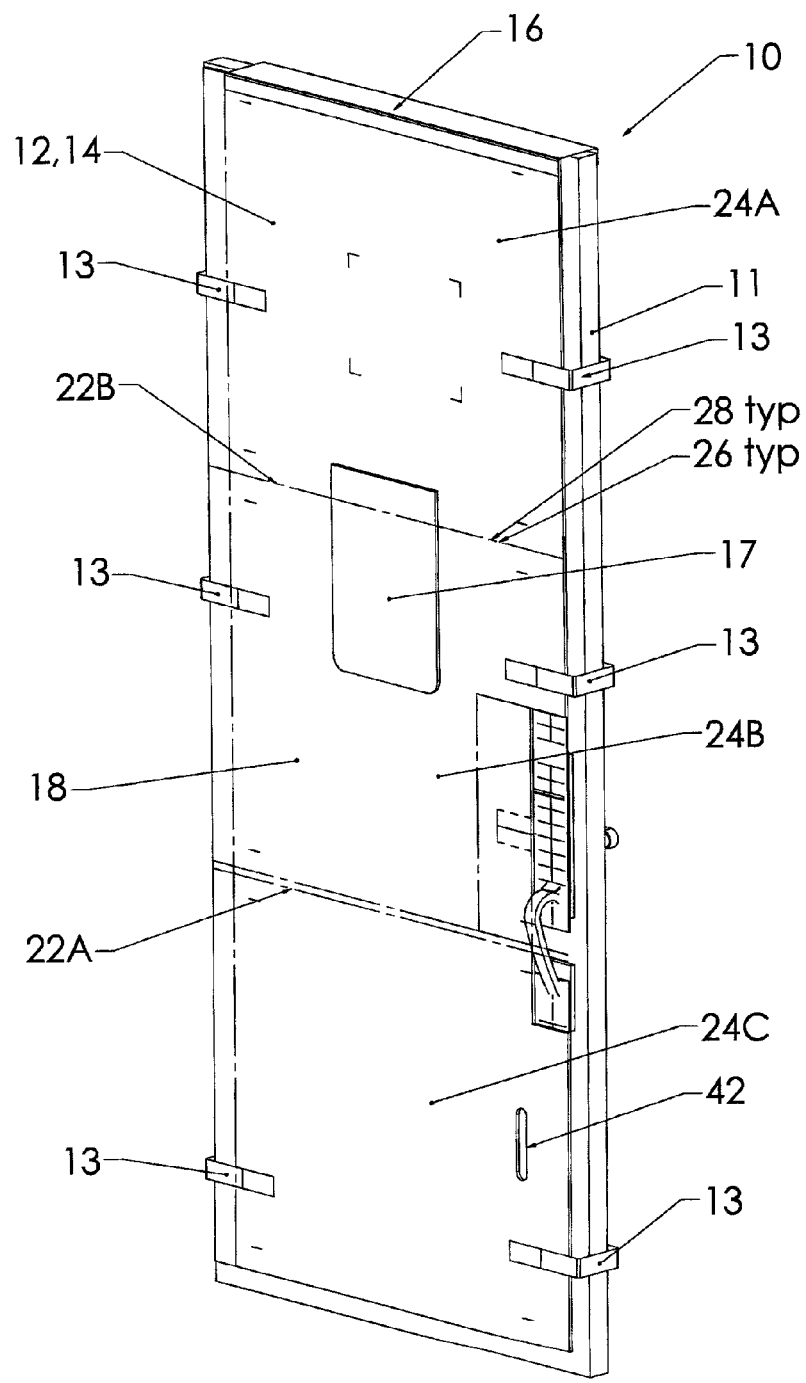
FIG. 1 is an isometric drawing of a door protective cover assembly installed on a door according to an embodiment of the present invention

Embodiments of the present invention comprise relatively inexpensive, foldable door protective covers that each provides impact and surface protection of both sides of an associated hung and installed door while permitting the door to be fully functional. Accordingly, when used in office, residential or commercial buildings during construction or remodeling, the door can be closed and locked to secure a work area from incidental damage from unauthorized occupants, vandalism and theft.

A first embodiment comprises a pair of corrugated cardboard panels that are creased in one or more spaced locations widthwise permitting each panel to be folded in half, thirds or fourths or other suitable fractional portions. The corrugated cardboard is (i) inexpensive compared to cloth, and provides significant protection for light to moderate impacts against the surface of the door that would otherwise dent the surface if the door was covered in mere fabric sheet or thin plastic sheeting. Perforations, die cuts and fold away areas are typically provided in cardboard at strategic locations to permit a user to (i) punch out openings in the appropriate locations for door handles, door knobs and/or dead bolt lock key receptacles and/or (ii) fold away sections or portions out of the way to allow access to or installation of door hardware. Furthermore, perforations and/or die cuts can be provided along the lengthwise and even widthwise edges of the panels to permit a user to adjust the size of the as-supplied panels by way of a 'breakaway edge' that will then allow the protective cover assembly to fit standard size doors that are smaller than the panels' initial sizes.

The cardboard is typically backed with a nonabrasive sheet material. In one variation the nonabrasive material comprises a water-based synthetic emulsion, such as Nomar™, manufactured by Michelman, Inc. of Cincinnati, Ohio. Typically, the Nomar™ is applied as a coated linerboard to the entirety of the back sides of the panels effectively encapsulating and isolating the potentially abrasive fibers of the cardboard from being in direct contact with the associated door. In some variations, a Nomar™ coated liner board forms the back side of the corrugated cardboard with the coated liner board being applied during the fabrication of the cardboard. In another variation, the corrugated cardboard is fabricated first with an uncoated back side liner board and a second sheet of Nomar™ coated liner board is later applied and adhesively adhered to the backside creating a backside that essentially comprises two layers of liner board. Similar linerboard coatings and coated linerboards produced by other manufacturers can also be used in place of Nomar™. In yet another variation, an encapsulating coating, such as Nomar™, can be applied to the surface of the cardboard's back side liner board after the cardboard has been fabricated.

In another variation, expanded polyethylene foam sheet (EPE) is adhesively secured to the backside of the cardboard panels. The EPE may be adhesive-applied as strips or sheets to portions of the backside surfaces or the EPE may be applied to substantially the entire backside of the panels.

In yet another variation a towel lined linerboard, such as LamaCorr™ by Corrugated Services LP of Forney, Tex., comprises the back side of the corrugated panels. The towel lining typically comprises a non-woven paper that is laminated to linerboard and is specifically designed to be non-abrasive to delicate finishes. Other variations are also contemplated using other substantially non-abrasive sheet and film materials that either substantially or partially cover the backside of the panels to protect the finish of an underlying door.

Also provided with the first embodiment door protector are one or more pieces of saddle tape. The tape typically comprises one or more strips of polymeric material having a pressure sensitive adhesive on sections of the bottom side extending inwardly from either end but flanking a center section having no adhesive thereon. The saddle tape is used to join the front and back panels together typically over the top edge of the door. Since the adhesive sections are located at the end sections, the pressure sensitive adhesive never comes in contact with the door so no residue is left on the door, and delicate door finishes are not otherwise damaged, once the protector is removed. As can be appreciated in certain variations, saddle tape pieces can also be used to secure the panels together across the door's side edges and even along the door's bottom edge.

In some variations, saddle tape may comprise hook and/or loop strips, such as Velcro™, that attach to mating hook and loop pieces secured to the outside surfaces of the panels in suitable locations. In yet other variations other types of saddle elements may be utilized that effectively serve a similar purpose as the saddle tape.

A second embodiment door protector is substantially similar to the first embodiment in most aspects except it comprises a paper fiberboard in place of the corrugated cardboard. The second embodiment includes saddle tape similar to that described above as well as a non-abrasive backside coating or materials to protect an associated door's finish.

A third embodiment of the door protector is comprised primarily of EPE or a similar foam material. In at least one variation, the protector comprises a single piece of EPE that is compacted and or mechanically altered at hinge and saddle locations to permit the protector to fold for storage and shipment in a manner similar to the other embodiments. In one variation, the outside surface includes a sheet of polyethylene or other polymeric material that is fused or adhesively adhered to the foam to further increase the protector's puncture resistance. In yet another variation, the front sides of the door protector include a plurality of fiberboard or cardboard panels adhered to the EPE to further increase the protectors puncture resistance.

The third embodiment door protector can include many of the same features or elements as the first and second embodiments including partial die cuts for door handles and locks and/or foldaway regions covering door latch hardware and hinges.

With any of the variations indicia and graphical material, such as but not limited to logos, advertising, promotional materials and photographs, can be printed or applied to the exterior surface of the door protectors. In relation to the variations and embodiments where the exterior or outside surfaces of the protectors are cardboard, the indicia and graphical material can be printed directly onto the surfaces. In one variation, the indicia pertain to the particular manufacturer of the door protector and relevant contact information, such as a website or phone number is provided. In yet another variation, the indicia pertain to the purchaser of the protector or the particular site on which the protector is being utilized. For instance, if door protectors are being utilized in a hotel construction project, the door protectors may advertise hotel or the construction company involved in the hotel's construction or renovation. In yet other variations, the indicia may provide one or both of written and graphical instructions concerning the manner in which the door protector is to be utilized.

Terminology:

The terms and phrases as indicated in quotes ("") in this section are intended to have the meaning ascribed to them in this Terminology section applied to them throughout this document including the claims unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive rather the term is inclusive meaning "either or both".

References in the specification to "one embodiment", "an embodiment", "a preferred embodiment", "an alternative embodiment" and similar phrases mean that a particular feature, structure, or characteristic described in connection with the embodiment is included in at least an embodiment of the invention. The appearances of the phrase "in one embodiment" in various places in the specification are not necessarily all meant to refer to the same embodiment.

The term "couple" or "coupled" as used in this specification and the appended claims refers to either an indirect or direct connection between the identified elements, components or objects. Often the manner of the coupling will be related specifically to the manner in which the two coupled elements interact.

Directional and/or relationary terms such as, but not limited to, left, right, nadir, apex, top, bottom, vertical, horizontal, back, front and lateral are relative to each other and are dependent on the specific orientation of a applicable element or article, and are used accordingly to aid in the description of the various embodiments and are not necessarily intended to be construed as limiting.

As applicable, the terms "about" or "generally" as used herein unless otherwise indicated means a margin of +−20%. Also, as applicable, the term "substantially" as used herein unless otherwise indicated means a margin of +−10%. It is to be appreciated that not all uses of the above terms are quantifiable such that the referenced ranges can be applied.

The terms "Saddle", Saddle Tape" and "Saddle Element" as used herein refer to the portion of the door protector that is adapted to be hung over the top horizontal edge of an associated door off of which the front and back panels of the protector typically hang. For instance, depending on the embodiment and variation, the Saddle Element(s) can comprise thin flexible plastic sheet material, woven or non-woven fabric, paper and/or straps. The Saddle Element(s) can include portions with adhesive applied thereto to secure it to the cardboard sheets or in other variations it can comprise a hook or loop material with corresponding hook and loop material also being applied to the cardboard sheets proximate their top edges.

The term "Edge Tape" as used herein refers to pieces of tape used to secure the front and back panels of the door protector together along the vertically extending edges thereof. The edge tape can comprise a pressure sensitive adhesive on one side thereof but only proximate the ends thereof so that no adhesive (or only a minimal amount of adhesive) comes in contact with the sides of an associated door but the tape can firmly affix to the surfaces of the front and rear panels of the door protector. Like the Saddle Element(s), the Edge Tape can also, but not necessarily, comprise thin flexible plastic sheet material, woven or non-woven fabric, paper and/or straps. Also, in some variations in place of the adhesive hook and loop material can be utilized.

The term "Fiberboard" refers to a generally rigid or semi-rigid sheet material that is comprised primarily of wood or paper fibers. Paper fiberboard as the name suggests is comprised primarily of paper fibers. Typically, although not necessarily, the fibers comprising the fiberboard are randomly configured and bound together with a suitable resin.

The term "cardboard" generally refers to a paper-based fiberboard or a product produced from a paper-based fiberboard, such as "Corrugated Cardboard". "Corrugated Cardboard" refers to a cardboard comprising a plurality of generally thin planar or cardboard sheets, also known as "Linerboard", that sandwich and are attached to undulating (or arched) layers of cardboard.

As used herein, the term "Non-Abrasive" refers to a material property wherein the material possessing this property substantially does not mar or scratch the surface or the finish of a typical door whether made of wood or another material. In some variations and embodiments, linerboard and consequently corrugated cardboard can be made that has a surface, even a single surface, that possesses Non-Abrasive characteristics.

Perforations, "Die Cuts", and "Knifes" refer to partial or complete cuts or tears in a material that may or may not extend through the entire thickness of an associated material.

The term "Knockouts" as used herein refers to portions of a panel or sheet that can be removed to create desirable features such as handles or access points.

A First Embodiment Door Protector

A first embodiment door protector assembly 10 installed on a door 11 is illustrated in FIG. 1. The general design of the first embodiment door protector and several other embodiments described herein permits an associated door upon which the protector is placed to be operated in a normal fashion without the need to remove the protector in order to close and/or secure the door, thereby providing maximum protection during construction, remodeling or movement of furniture or equipment in or out of the spaces on either side of the door.

The door protector comprises: (i) a front panel 12 that covers the substantial entirety of one face of the associated door 11; (ii) a back panel 14 that covers the substantial entirety of the opposing face of the door; and (iii) a piece of saddle tape 16 that joins the front and rear panels together and straddles the top edge of the door. The vertical side edges of the door are typically not covered although in some variations additional pieces of Edge Tape 13 can be utilized to join the sections across the door's vertical side edges.

Furthermore, portions of the faces of the door may not be covered immediately proximate the doors vertical edges such that the covering does not hinder the operation of the door in a door frame. In one variation, the door protector is about 1.5 inches shorter in width than the door it is designed to protect such that approximately 0.75" wide portions of the door face are uncovered permitting the door to be opened, closed and latched.

Additionally, in variations, an opaque or translucent pouch 17 may be provided on one or both of the front and back panels 12&14 to store a construction punch list or other suitable information. For instance, the pouch can be used to store information relating to work that has been or needs to be completed within the room associated with the door 11.

Figure 2:
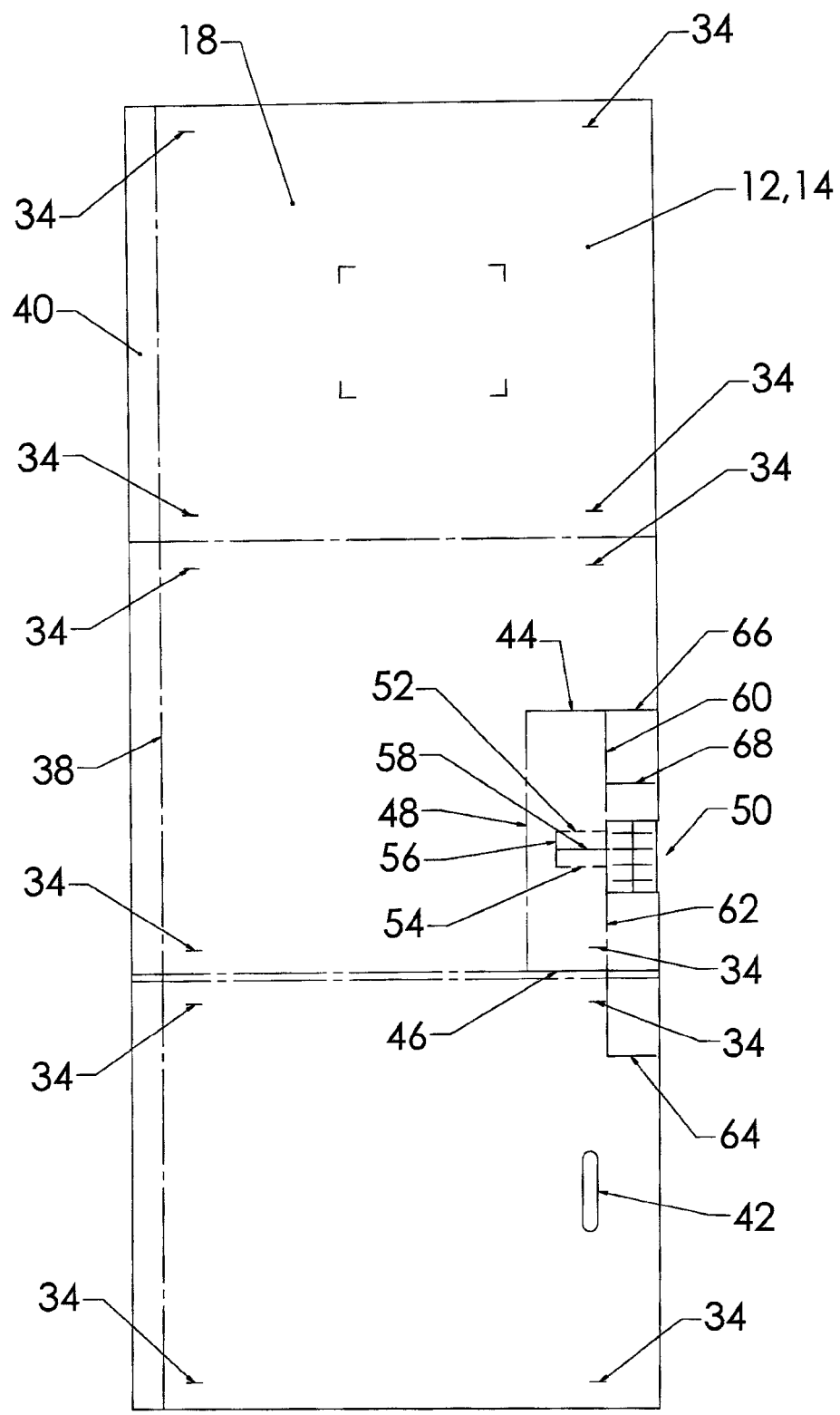
FIG. 2 is a front elevation view of a panel of a door protective cover according an embodiment of the present invention.
Figure 3:
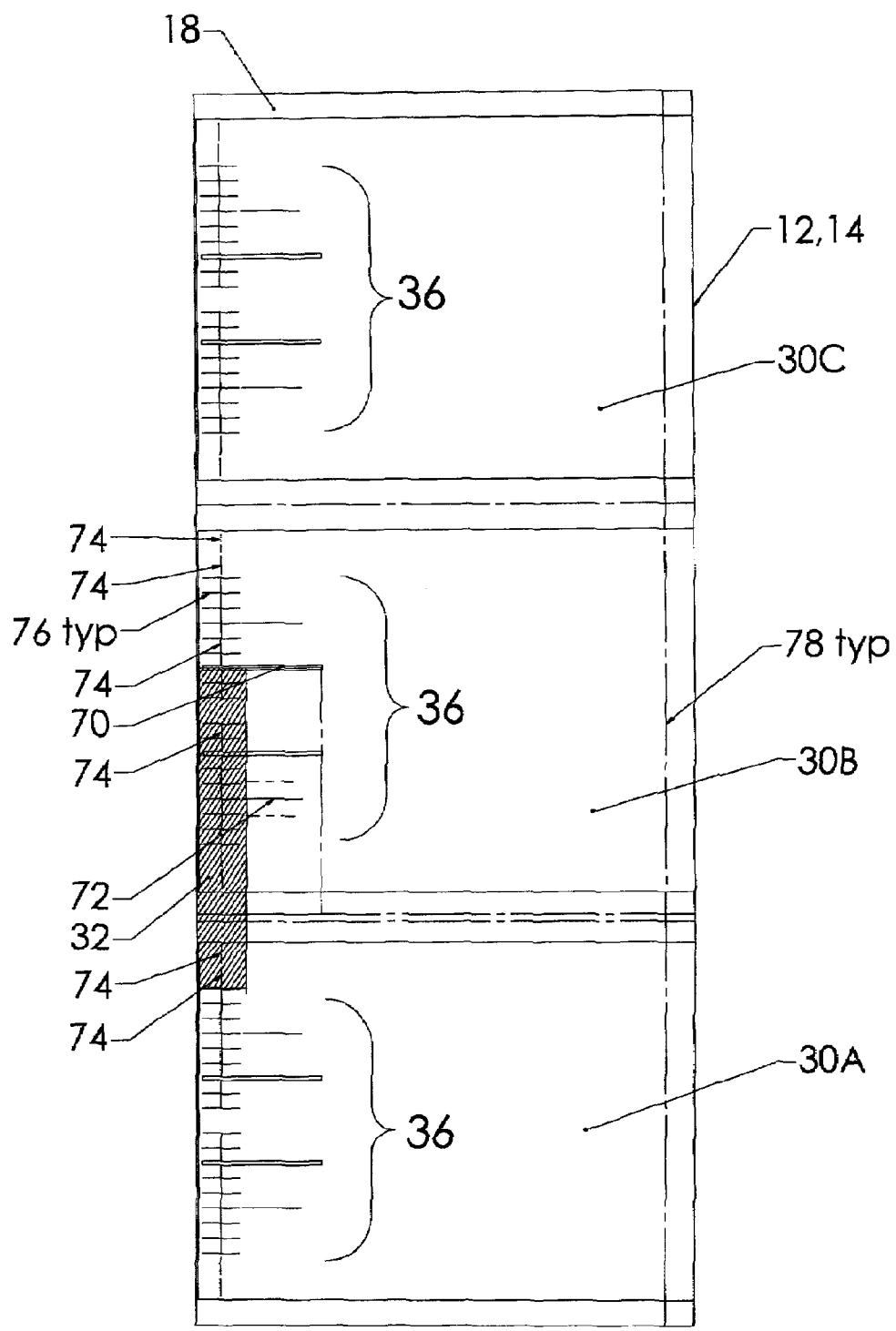
FIG. 3 is a back elevation view of a panel of a door protective cover according an embodiment of the present invention.

A front view of a typical front or back panel 12 & 14 is illustrated in FIG. 2 and a rear view of a typical front or back panel 12 & 14 is illustrated in FIG. 3. It is to be appreciated that in most variations the primary difference between the front and back panels is that they are mirror images of each other. Each panel of the first embodiment comprises an elongated sheet of corrugated cardboard 18 and one or more pieces of Expanded Polyethylene (EPE) foam adhesively bonded to a rear face of the cardboard sheet.

In one variation, double-wall corrugated cardboard sheet 18 having a thickness of about ¼" is utilized to form the front and back panels 12 & 14, although cardboard of differing thickness and configurations, such as single and even triple wall varieties, can be utilized in different variations. By varying the type and thickness of the cardboard utilized, the amount of the puncture and impact protection can be varied.

Figure 4:
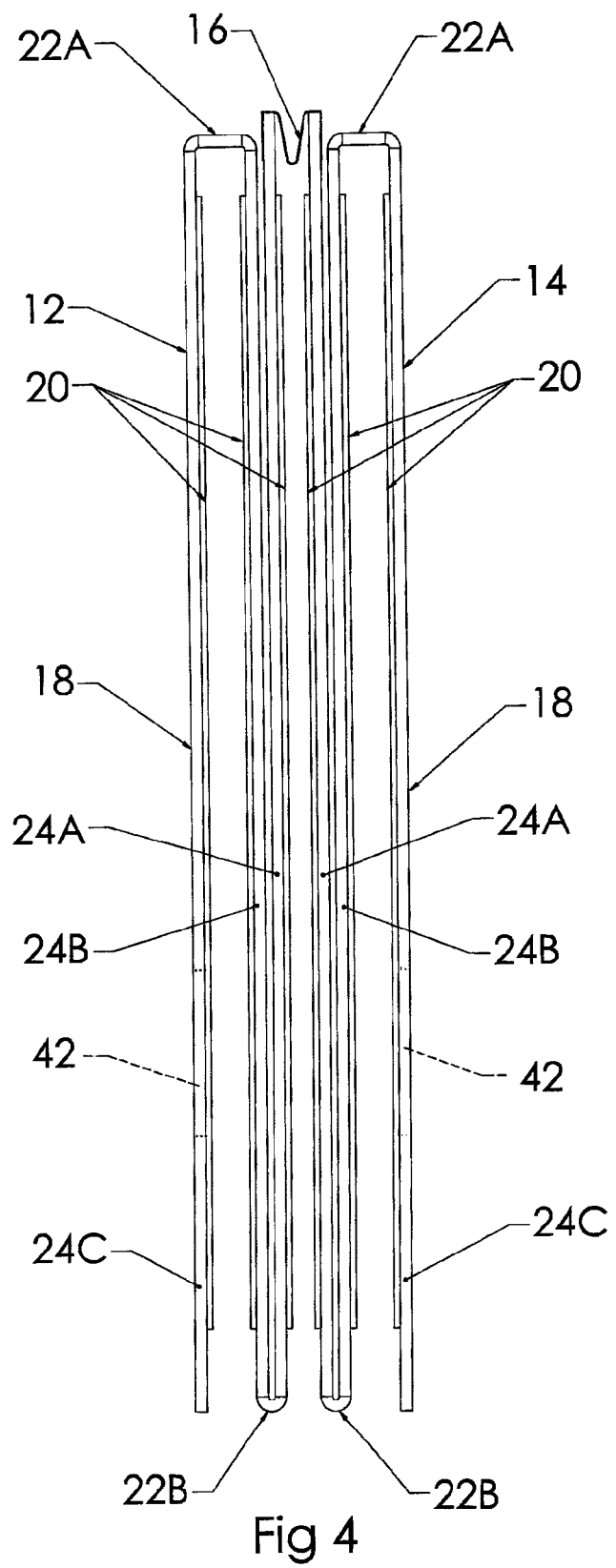
FIG. 4 is a side view of the door protective cover assembly in its folded storage/shipping configuration according to an embodiment of the present invention.

As shown, two horizontally extending folds 22A & 22B are provided in the panel 12 & 14 effectively dividing the panel into three equally sized sections 24A, 24B & 24C that can be folded back onto one another to as shown for instance in FIG. 4. The folds are typically formed during the manufacture of the cardboard sheet although in other variations the folds can be mechanically formed in the cardboard sheet after the sheet's fabrication. For instance in some variations, the folds are formed by horizontally scoring the sheet's faces at desired locations. In yet other variations, the fold score lines are also perforated to facilitate easier folding. For instance, the faces of the cardboard sheet may include ½ inch long perforations every ½ inch along the length of each score line. As is commonly referred to in the art, the scored portions are referred to as nicks and the perforated portions are known as knifes.

A number of nick 26 and knife perforations 28, as well as several cutout regions, are provided on each cardboard panel to, for instance, permit access to or installation of door hardware there beneath. The specific configuration of the perforations and cutouts in relation to the first embodiment are described in greater detail below.

As illustrated in FIGS. 3 & 4, three sheets 30A, 30B & 30C of EPE foam are adhesively bonded to the rear side of the cardboard sheet 18 of a typical panel 12 & 14. One purpose of the foam is to isolate the potentially abrasive rear side of the cardboard from the finished surface of an associated door 11, thereby substantially minimizing any marring of the door's surfaces. Further, the foam increases the impact resistance of the door protector assembly reducing the risk of damage to the door from incidental contact by foreign objects. The thickness of the foam can vary substantially depending on the desired level of protection; however, in certain preferred variations a thickness of about 0.10" to 0.20" has found to provide a good balance between added impact protection and EPE material cost.

Although the foam material as specifically described herein is fabricated of EPE, in variations the foam can be comprised of other polymeric materials including, but not limited to, polyurethane foam, polystyrene foam and polypropylene foam. Further as described below in relation to the other embodiments, other materials, such as a towel lining or a non-abrasive coating, can be used in place of the sheet foam.

A sheet of foam is vertically centered in each of the three equally-sized sections formed by the cardboard sheet's edges and the folds 22A & 22B. As shown best in FIG. 3, the horizontal edges of the foam are positioned approximately 1-3 inches from an adjacent parallel horizontal fold or edge of the cardboard sheet. In relation to the folds specifically, spacing the horizontal foam edges a short distance therefrom minimizes any interference that the foam sheet might cause when folding the panel into its shipping/storage configuration. As illustrated in FIG. 3, however, the foam does extend substantially the entire width of each panel section 24A-C such that the cardboard sheet's vertical edges and the surface closely proximate these edges do not come into contact with the door surfaces.

The EPE foam pieces 30A-C are typically adhesively bonded to the rear face of the cardboard sheet using any suitable means. In one variation, a film of contact adhesive is utilized that is first applied to the back surface of the foam pieces by spraying. In other variations, double-sided tape is applied to the rear sides of either the foam pieces or the respective sections of the cardboard sheet. No adhesive is typically applied to the portion of the foam or underlying cardboard surface in the shaded region 32 of FIG. 3. As described in greater detail below, this region corresponds to the area where the door handle or door knob of the door is pushed through provided slot in the cardboard sheet and the EPE foam when the door protector is installed. As can be appreciated, if an adhesive, especially a spray-type contact adhesive, were applied to the foam/cardboard interface in this region, some adhesive transfer could occur as the handle/knob were pushed through the associated panel. The adhesive, if transferred to the door handle/knob, could then be transferred to the hands of someone who uses opens or closes the door.

Referring to FIG. 2, four small slits 34 are provided on each section 24A-C of each of the front and back panels 12 & 14. These horizontally-extending slits define the proper placement positions for the top and bottom horizontal edges of the foam pieces so that a fabricator can quickly and accurately place and align the foam pieces on the cardboard sheets. Incidentally, the vertical edges of the foam sheet pieces are aligned with the vertical edges of the associated cardboard sheet.

Referring back to FIG. 3, a number of slits and perforations are also provided on each of the EPE foam pieces. The same set of perforations are provided on each foam piece; however, the slits on only the center foam piece 30B and perhaps one slit on the bottom piece of foam are utilized in any door protector assembly. Rather, it is less expensive to slit all foam pieces during their fabrication to create a universal foam piece rather than have to keep the top, middle and bottom pieces separate from each other during the adhesive bonding operation. Accordingly, a fabricator need only worry about facing the set of perforations and slits in the proper direction and properly aligning the foam on the cardboard sheet sections and not have to worry about whether a particular piece of foam is a top, middle or bottom piece. The slits in the foam sheets are described in greater detail below.

As mentioned above, various slots, perforations, scores, nicks and knifes, knockouts, flaps and/or die-cuts are provided in both the cardboard sheet and the EPE foam. These features serve a variety of functions including but are not limited to providing: (i) locational references for various elements that are to be attached to the cardboard sheets such as the slits/knifes 34 for the foam pieces described above; (ii) handle openings 42 to permit the assembly to be lifted and carried with greater ease; (iii) flaps to permit a user to access the door hardware, such as the key hole; (iv) openings through which a door knob/handle can be passed; (v) tear off sections to adjust the width of the panels to fit doors of differing widths; and (vi) horizontal folds by which the panels can be folded for transport and storage.

The horizontal folds 22A & B are best illustrated in their unfolded configuration in FIG. 1 and in their folded configuration in FIG. 4 and are also described generally above. The top horizontal fold 22B comprises score lines located one third the length of each panel down from the panel's top edge on each face of the cardboard sheet 18. Further in certain variations the scores are perforated with ½ inch knifes every ½ inch. When the top fold is folded the front faces of the top and middle sections face each other and the rear faces, to which the EPE foam is adhered, face away from each other.

The lower fold 22A differs some from the top fold in that it comprises a pair of closely spaced parallel score lines located about one third the length of each panel from the bottom edge on each face of each cardboard sheet 18. In a typical variation with ⅛ inch thick EPE foam pieces, the score lines are spaced from each other about ¼ inch. The spacing of the score lines may be slightly closer for the score lines on the rear face of the cardboard sheet than on the front face. Accordingly, the spacing between the parallel score lines on each face permits the middle and bottom sections to fold in such a manner that the rear faces of the sections with the EPE foam face each other and the thickness of the foam does not interfere with the ability of the sections to be folded flat against each other. In certain variations, the score lines of the lower fold may be similarly perforated as the score lines of the top fold.

As shown in FIG. 2, a vertical line 38 of perforations extend from the top edge of each cardboard sheet 18 to the bottom edge on each face thereof. Typically, the perforation lines are located up to a few inches from a vertical edge of each panel creating a thin strip 40. The perforation lines are configured to permit a user to easy tear off the thin strip to size the panel for a narrower door. For instance, one variation of the door protector assembly comprises 34.125" wide panels for a nominal 36" wide door (and associated cardboard sheets) that have a vertical perforation lines positioned about 2 inches in from one of the panels' vertical edges. Accordingly, to size the door protector assembly for a nominal 34" door, the user need only tear off the thin strips on each panel. In the fourth embodiment described below, the thin strip may be provided on an as-produced panel for manufacturing convenience, but if the panel is ordered to be used on a less wide door, the thin strip is removed before the corresponding hook or loop material pieces are affixed to the panel assuring that the hook or loop pieces extend fully to the edge of the panel. It is to be appreciated that variations may include more than a single set of vertical lines of perforations such that a single door protector assembly can be sized for more than two door width sizes. It is further appreciated that other variations may not include the vertical lines of perforations at all and instead be sized for use with a single door size.

The configuration of the various perforations provided herein can vary depending on whether the intended use is to tear the cardboard along a perforated portion or simply fold the cardboard along the perforated portion. As is intuitively obvious, the ratio of knifes to nicks is increased along perforation lines that are intended to tear and reduced along perforation lines that are merely intended to fold. In one variation, the perforation lines associated with the removable strips comprises 5¹³⁄₁₆" of knife cuts separated by ½" nicks thereby making the removal of the strip relatively easy.

In certain variations of the first embodiment, handle cutouts 42 or knockouts are provided on the bottom section of each panel generally proximate a vertical edge thereof. The general position of the handles (one on each panel of the assembly) when the assembly is in its folded configuration are indicated in FIG. 4. The handles make carrying the folded assembly easier as the panels tend to be slippery and somewhat awkward to negotiate in the absence of such handles. The handles can be used when the product is new or after the protector is removed from a door and refolded for transport to a new door or to storage. When a used protector is removed from a door and refolded, often edge tape (or hook and loop fasteners as described below concerning the fourth embodiment) will be applied to the sides of the folded protector to hold it in its compact configuration.

Along and proximate the vertical edge of each panel typically on the opposite side of the vertical thin strip(s) 40, a plurality of horizontal and vertical perforations, cut outs and slits are provided primarily in the middle section 24B but in variations extending into the bottom and possibly the top sections as well. These perforations, cutouts and slits are provided proximate the location on most doors where door hardware, such as lock, handles and knobs are typically located. These various features permit access to the hardware while the door protector assembly is installed while continuing to provide the maximum degree of protection to the remainder of the associated door. Accordingly, the door can be used in a normal fashion while the protector remains in place.

To permit general access to the entire region of the door wherein the hardware is typically located, such as might be required when the hardware is being installed, a pair of spaced horizontal slits 44 & 46 that extend inwardly from a vertical edge are provided that each respectively intersect with opposing ends of a vertical perforated portion such that the entire associated portion can be folded away from the door along fold line 48 to give a user access to the portion of the door therebeneath. Once access to this portion of the door is no longer required the fold away flap cardboard portion can be folded back in place. It is appreciated that as illustrated in FIG. 2 the lower slit corresponds with the upper score line of the lower fold.

In the illustrated embodiment of FIG. 2, a section of each cardboard sheet is cut completely away proximate the corresponding location of a door handle or knob on a typical door such that the EPE foam 30B located therebeneath is visible. As shown the cut away section 50 is approximately 4 inches tall by 3⅜" wide and is located approximately 32½" above the bottom edge of the panel.

Extending inwardly to the left of the cut away section a distance of about 3" are two spaced horizontal lines of perforations 52 & 54 configured to permit the cardboard to be folded therealong. The leftward edges of the two horizontal lines intersect with the ends of a vertical slit 56. Approximately halfway along the vertical slit a horizontal slit 58 extends to the edge of the aforementioned cut away section. This series of slits and perforations form a pair of horizontally pivoting flaps that permits an elongated horizontal door handle to pass therethrough as the assembly is installed on an associated door. Once the leftmost portion of the elongated door handle has passed through the flaps, the flaps can be closed thereby providing protection to the portion of the door surface underneath the handle but still permitting functional use of the handle.

Generally coincident and parallel with the left edge of the cutaway section vertical lines 60 & 62 of perforations extends upwardly and downwardly therefrom. The bottom vertical line extends across the lower fold lines 46 and terminates approximately 22¼ inches above the bottom edge of the associated cardboard sheet 18. At this terminate a slit 64 extends rightwardly to the edge of the cardboard sheet. Several additional horizontal slits may be provided but are not illustrated that extend between the bottom vertical line and the right edge of the cardboard sheet. These additional slits are provided in locations spaced between the bottommost slit and the bottom edge of the cutaway section. Accordingly, a user can fold open any one of the flaps formed by the slits to access locks or other door hardware that may exist on an associated door therebelow.

The upper vertical line 60 of perforations extends upwardly above the top edge of the cutaway section approximately 7 inches whereat it terminates and a horizontal slit 66 extends rightwardly to the right edge of panel. One or more additional intermediate slits 68 are provided in locations spaced between the topmost slit and the top edge of the cutaway section. These slits and perforations also create folds that provide access to the portion of the door directly above the cutaway section.

As described above a plurality of perforations and slits are provided in each of the EPE foam sheets that are adhesively bonded to the back sides of the top, middle and bottom sections of each panel. The plurality of slits provided on the right side of the EPE sheets as illustrated in FIG. 3 generally correspond to the slits provided in the cardboard sheet as illustrated in FIG. 2. For instance, the top elongated cutout slit 70 in the EPE foam as shown in FIG. 3 aligns with the top horizontal slit 44 in the cardboard sheet as shown in FIG. 2 when the EPE foam sheet is positioned in the middle section 24B. The lower medium length horizontal slit 72 of the EPE foam as shown in FIG. 3 aligns with the horizontal slit 58 in the cardboard shown in FIG. 2 through which an elongated handle can pass.

Spaced inwardly about 1½" from the left edge of the door protector as illustrated in FIG. 3, a series of aligned vertical slits 74 extend generally from the bottom edge to the top edge of each foam sheet. A plurality of about 2¾" horizontal slits 76 are centered across the aligned vertical slits. This combination of horizontal and vertical slits provides for access to the hardware located therebeneath when the protector assembly is installed on a door. Further, these slits provide openings for the door knobs and handles to pass through the foam sheet located at the middle section.

Located inwardly approximately 2" of the right opposing edge of each foam sheet is a vertical line 78 of perforations. This line of perforations is typically aligned with the vertical line 38 of perforations associated with the thin strip on the cardboard sheet 18. Accordingly, when the thin strip is torn away to resize the panel's width for narrower doors the corresponding portions of the three pieces of EPE foam are cleanly removed as well.

The various dimensions and configuration of the first embodiment panel assembly along with the locations of various features are merely exemplary and can vary substantially in variations. For example, a version is contemplated that has panels that fold along three horizontal fold locations and accordingly comprise four sections instead of three. The number and configuration of the foam sheets can also vary substantially. For instance, in place of three large foam pieces, a plurality of vertical or horizontal strips can be specified. The configurations of the various perforations, slits and cutouts can also vary substantially depending on the style and size of door a particular door protector is associated with.

Figure 5A:
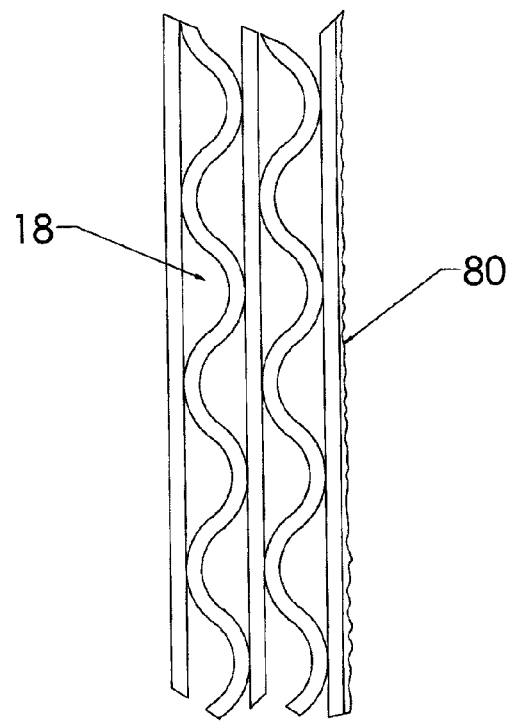
FIG. 5A is cross sectional view of a portion of a door panel comprising corrugated cardboard and a towel liner according to one embodiment of the present invention.

As mentioned above one of the primary functions of the EPE foam liner is to prevent the cardboard which can include abrasive fibers and particles on its face from marring or scratching the surface of an associated door. This purpose can also be accomplished with other materials such as a towel liner or a protective coating applied to the rear faces of the cardboard panels. In one variation, the towel liner 80 may comprise LamaCorr by Corrugated Services, LP of Forney Tex. LamaCorr is an air laid non-abrasive non-woven paper that is laminated to linerboard. Linerboard is the cardboard sheet material that is used to fabricate the corrugated cardboard. Accordingly, the use of a LamaCorr lined linerboard in the fabrication of the corrugated cardboard as appropriate eliminates the need for subsequent manufacturing operations to laminate or otherwise affix a liner to the rear faces of the cardboard sheets. To compensate for any loss of impact protection resulting from the substitution of a towel liner for the EPE foam, thicker corrugated cardboard, such as triple or even quadruple wall varieties, can be used in certain variations. A cross section of a portion of a door protector panel lined with LamaCorr or a similar towel liner is illustrated in FIG. 5A.

In other variations, a coating 82 can be applied directly to the rear faces of the corrugated cardboard sheets 18 that effectively encapsulate any exposed fibers and particulate on the back sides. One such coating used in at least one variation is Nomar™ produced by Michelman, Inc. of Cincinnati, Ohio although similar coatings by other manufacturers also exist and can be used as well.

Figure 5B:
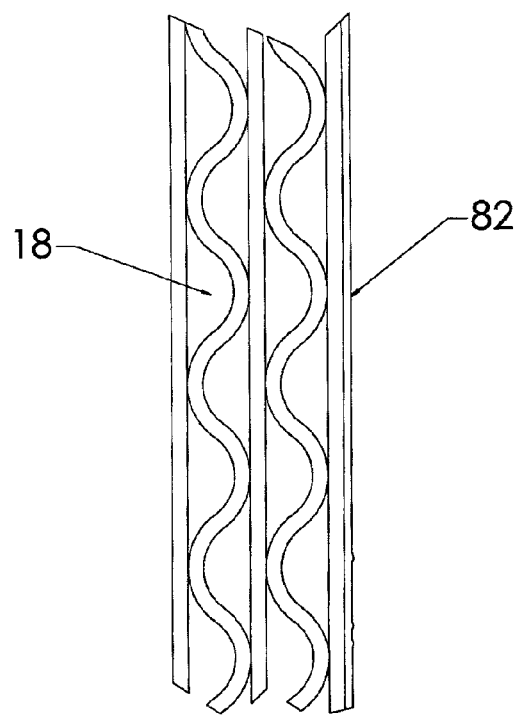
FIG. 5B is cross sectional view of a portion of a door panel comprising corrugated cardboard wherein the outside surface of the liner board forming the back side of the cardboard is coated with a non-abrasive coating according to one embodiment of the present invention.

In yet another variation, the liner board that has been pre-coated with the Nomar™ on one side can be used in the fabrication of the cardboard sheets in much the same manner as LamaCorr lined liner board is used in the previously described variation. In this variation, the use of a Nomar™ or a similar coating eliminates the relatively expensive process of adhering foam sheet to the cardboard. FIG. 5B is an illustration of a portion of double wall corrugated cardboard 18 that is coated on its rear face with a non-abrasive coating 82.

Alternatively, a sheet of coated liner board can be applied and adhesively bonded over a back side of the previously fabricated corrugated cardboard. In such a variation, the backside of the finished cardboard sheet 18 would have two plies of liner board on its back side. It is appreciated, however, that this variant will not have the cost advantages of the single ply coated back sheet variant described in the previous paragraph.

Once the front and back panels have been fabricated, they are typically joined proximate their respective top edges with one or more pieces of saddle tape 16. Saddle tape often comprises a thin sheet of polymeric material, such as but not limited to cellophane, or any other suitable polymeric material, that is secured to the front sides of both the front and back panels proximate and over the respective top edges thereof. In variations, the saddle tape pieces (or saddle elements) can also comprise woven fabric, non-woven fabric or a paper material. Typically, the pieces of saddle tape are adhesively secured to the panels although other means may be used as well such as mechanical joining, hook and loop material and stitching. As illustrated in FIGS. 1 and 4 only a single piece of saddle tape is utilized that spans substantially the entire width of the panels; however, two or more smaller pieces can be used in variations.

When an adhesive is used, it is typically applied only to the end portions of the tape that overlaps the front and back panels so that no adhesive is in contact with the top surface of the door so that no adhesive residue is transferred to the door. In some variations, the adhesive is a pressure sensitive adhesive that is applied to the appropriate sections of the tape; however, in other variations, a contact adhesive may be sprayed, rolled or otherwise applied to the tape nearly contemporaneously with the tapes affixation to panels. In one variation, a saddle tape having adhesive applied to its entire surface is utilized, but to prevent the exposed saddle tape from sticking to the top edge of a door to which the door protector is applied, the exposed adhesive may be coated with a suitable particulate to render the exposed adhesive substantially ineffective.

In one variation, the saddle tape 16 is applied at the time of the door protector's fabrication and is packaged as a complete unit ready for use such as illustrated in FIG. 4. In contrast, the door protector can also be supplied in a partially assembly configuration where the user applies the pressure sensitive adhesive coated saddle tap pieces to the respective front and back panels.

Referring to FIG. 1, additional pieces of edge tape 13 may be provided to join the back and front panels to each other along the vertical sides of the panels. In some variations the edge tape may be of the pressure sensitive adhesive type but in other variations the edge tape may be reusable, such as when it comprises either hook and loop material and a corresponding piece of hook or loop material is provided on the cardboard sheets 18. As with adhesive saddle tape 16, edge tape of the pressure sensitive adhesive variant may have the adhesive applied to one surface proximate the ends thereof with the center portion being substantially free of adhesive thereby minimizing any risk of adhesive transfer to the associated door.

A Second Embodiment Door Protector

A second embodiment of the door protector as illustrated is substantially similar to the first embodiment except instead of comprising a corrugated cardboard, this embodiment utilizes a paper fiberboard. The second embodiment includes: (i) a plurality of width-wise folds; (ii) slits, die-cuts and perforations to permit access to door handles and other door hardware; (iii) EPE or other foam bonded to the backside of the fiberboard sheets to protect the door's surface from marring and to provide impact resistance; and (iv) one or more saddle tape pieces joining the front and back panels together. Generally, the second embodiment is substantially the same as the first embodiment save for the substitution of paper fiberboard for the cardboard. Accordingly, the second embodiment door protector looks generally similar to the illustrations provided for the first embodiment save for the corrugated cardboard.

Variations of this embodiment are also contemplated where the panels have towel lined backsides in place of the foam. Furthermore, in yet another variation a coating, such as the aforementioned Nomar™, could be applied to the backside surface. It is to be appreciated that in either of these variations, the door protector will not provide significant cushioning or impact absorption, although the stiffness of the paper fiberboard will act to dissipate a significant portion of any impact load over a wider portion of an associated door than if a more compliant material were utilized.

A Third Embodiment Door Protector

Figure 6A:
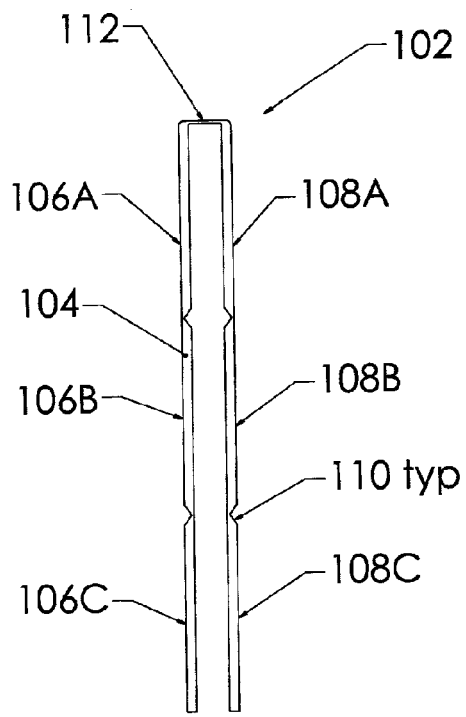
FIG. 6A is a side view of a door protective cover according to yet another embodiment of the present invention.
Figure 6B:
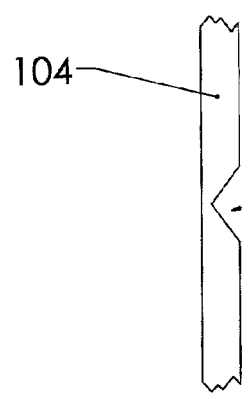
FIG. 6B is a close up side view of one variation of a living hinge of the door protective cover of FIG. 6A according to an embodiment of the present invention.
Figure 6C:
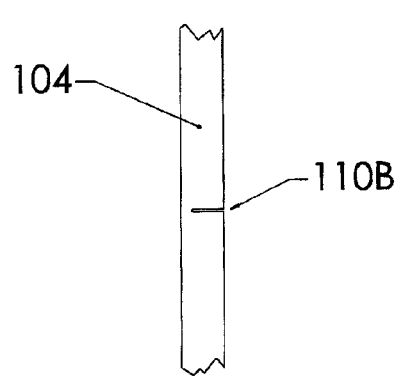
FIG. 6C is a close up side view of another variation of a living hinge of the door protective cover of FIG. 6A according to an embodiment of the present invention.

Referring to FIGS. 6A-C, cross sections of a third embodiment door protector 102 are illustrated. The third embodiment and its variations differ primarily from the first and second embodiments in that no cardboard or fiberboard sheets are utilized. Rather, the third embodiment is comprised substantially, and in some variations entirely, of sheet foam, such as but not limited to EPE.

As illustrated in FIG. 6A, the entire door protector unit is comprised of a single sheet of EPE foam 104. The foam is typically thicker than the foam used as the backing material in the previously described embodiments and as such imparts a measure of rigidity to the panels whereas a thinner sheet would have a greater tendency to curl and even blow away from the door's surfaces when subjected to air currents within an associated room or space. A typical thickness of EPE foam is about ½" but variations are contemplated that vary from ¼" to up to about an inch.

Like the other embodiments, the front and rear panel portions are divided into a plurality of sections 106A-C & 108A-C that permit the protector to be folded to a smaller size for storage and or transport. As can be appreciated, thick foam material does not bend well so the foam material must be configured to permit easy folding. In one variation as illustrated in FIG. 6B, the foam material is compressed in the region of a desired fold line 110A. Compression of the foam is affected by applying a heated mandrel to the foam in the region where the fold line is to be created. The heated mandrel is typically heated to a temperature close to or in excess of the melting point of the thermoplastic plastic comprising the foam. Accordingly, the polymeric material, polyethylene in the case of EPE foam, is compressed in the fold line region permitting the panel to be folded thereat. To produce the cross section illustrated in FIG. 6A, a mandrel with a triangular cross section is utilized. The panel portions are folded towards each other opposite the depression or notch created by the heated compression of the fold line region.

By compressing the material instead of mechanically removing or cutting the material from the foam at the fold line region, the material at the fold line is made denser and is thereby toughened and made more resistant to tearing. It is appreciated that fold lines 110B can also be created by slicing through a significant portion of the EPE sheet's thickness at the desired fold line location as illustrated in FIG. 6A. Generally, creating a fold line by cutting or mechanically removing material will not create a fold line that is as strong or tough as a fold line created using a heated mandrel but a cutting or slicing process may be less expensive and therefore more desirable for certain applications.

To place the third embodiment over a door and allow the normal operation of the door in its doorframe the saddle portion 112 of the protector joining the front and back panels must be sufficiently thin. In one variation, the saddle portion is compressed using a heated rectangular mandrel much in the same manner as the various fold lines. Accordingly, a highly compressed relatively dense film of polyethylene (or other thermoplastic material) is created that like the fold line joints is both strong and tear resistant. In variations of the third embodiment, a substantial portion of the EPE can be mechanically removed, such as by cutting, to make the saddle portion suitably thin.

In other variations, a relatively thin film of polymeric material can be laminated to one or both the front and back surfaces of the foam to increase its toughness and strength especially at the fold lines and at the top portion. In one of these variations, the film can comprise the same polymeric material as the foam, such as polyethylene film when EPE foam is specified, and be fused against the foam using heat and light compression. In yet another variation, the film need not be comprised of the same basic polymer as the foam and can be adhesively laminated to the foam sheet.

In yet other variations of the third embodiment, the foam sheet either before or after formation of the thin top portion and the fold lines can be run through a pair of opposed heated rollers or platens that compresses the foam a specified amount and effectively forms a thin toughening film on the surfaces of the foam sheet.

Like the previous embodiments, the foam panels of the third embodiment can also include cutouts, perforations, slices and additional fold lines to accomplish the same purposes identified above. The actual configuration of these various features may differ somewhat from the features described in relation to the first embodiment given the different properties of the foam sheet while providing similar functionality by permitting a user to operate and install hardware on a door when the door protector is installed thereon.

A Fourth Embodiment Door Protector

Referring to FIGS. 7-11, a fourth embodiment door protector 100 is illustrated. The fourth embodiment is similar in many respects to one or more variations described above relative to the first embodiment. It differs primarily in the location and configuration of the various provided perforations, cutouts and slits in the region that corresponds to the location of the door knob/handle and lock hardware on a typical door.

Additionally, loop straps 113 that are each typically adhesively affixed to one cardboard sheet proximate a vertical edge thereof are provided in place of edge tape. Correspondingly, a strip 115 of corresponding hook material is affixed proximate a corresponding vertical edge of the associated opposing cardboard sheet for each strap. The straps serve three purposes: (1) to hold the door protector against a door when in the deployed configuration; (2) to retain the door protector in its folded configuration when it is not being used; and (3) allow adjustment of the door protector as it is positioned on a door such that the door can be closed with the door protector attached.

Further, the fourth embodiment door protector may include indicia 134C, typically including graphical images, printed thereon providing instructions on how to use the product as well as indicia 134A & B indicating the source of the door protector along with contact information. Further, the surfaces of the protector may be imprinted with advertising or marketing indicia. The manufacturer may offer those purchasing a certain number of units the option of deciding what information and/or images are to be printed on the door protectors. For instance, a contractor ordering a large number for a large commercial or residential project may desire to have information about itself or the project printed on the protector. In other instances, the manufacturer of the door protector may sell advertising space on the door protector that is generally pertinent to the people that are likely to view the door protector. For instance, a power tool manufacturer may advertise its products as the protector is likely to be seen by many construction workers who are likely to consider purchasing power tools the company manufactures. It is to be appreciated that full color printing is possible on the cardboard comprising the protectors and in other variations printed material can be laminated onto the cardboard.

Figure 7:
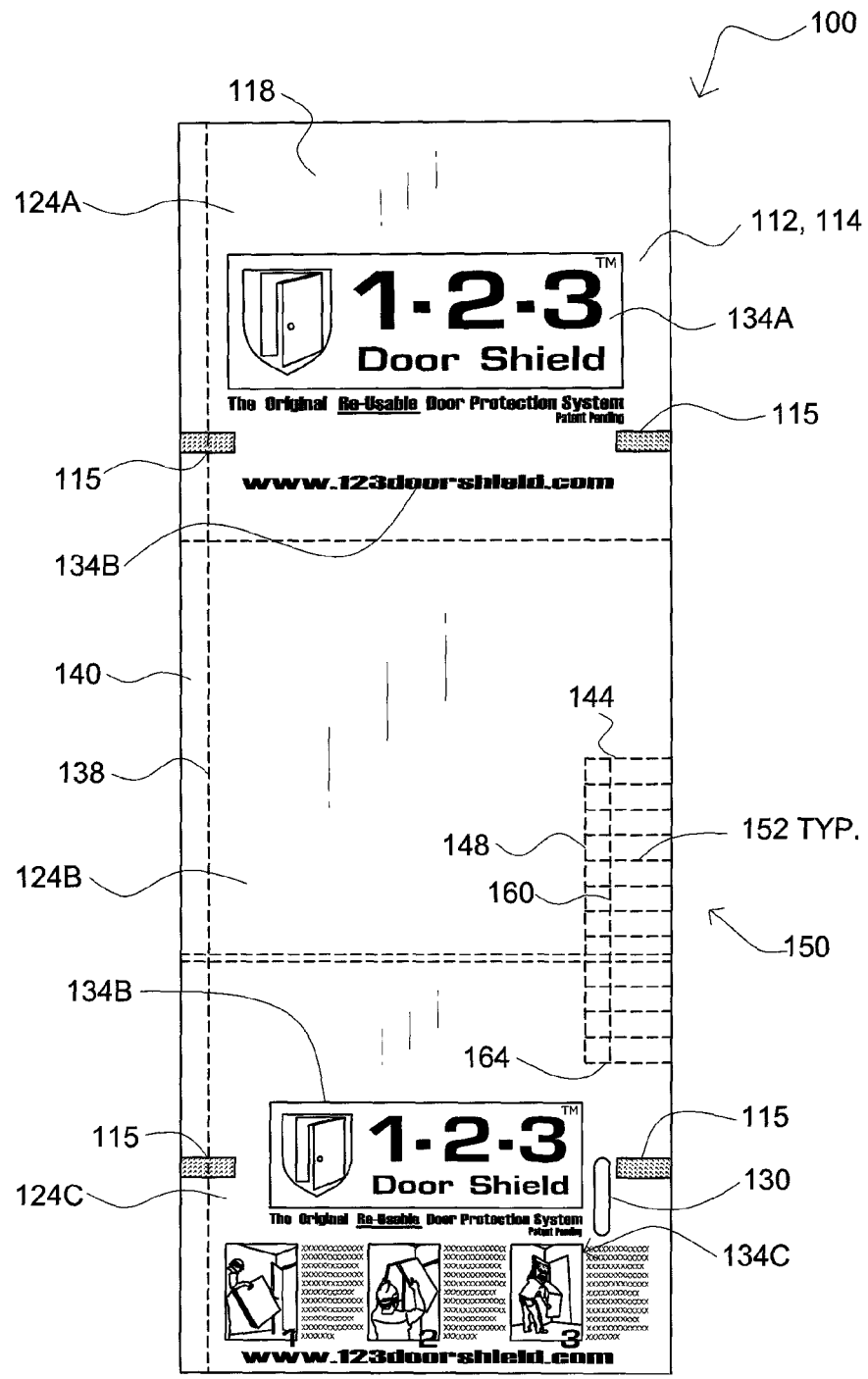
FIG. 7 is a front side view of a panel of a door protective cover according another embodiment of the present invention.

An outside surface of one panel 112 or 114 of a door protector 100 is illustrated in FIG. 7. The panel comprises a corrugated cardboard sheet 118 of similar construction to the corrugated cardboard sheet 18 of the first embodiment. In a preferred variation, the corrugated cardboard sheet is similarly configured as described above with reference to FIG. 5B. Specifically, the cardboard comprises two exterior sheets of liner board sandwiching two corrugated sheets which sandwich a flat center sheet of liner board. The exterior surface of the back sheet of liner board is preferably coated with Nomar™ 82 or another similar type of coating.

In general, the perforations, cutouts, slits and knockouts in the cardboard sheet of the fourth embodiment are substantially similar to those in the cardboard sheet of the first embodiment excepting the region along one vertical edge spanning between bottom and middle sections that typically corresponds to the location of door hardware of an associated door.

The door hardware access region 150 of the fourth embodiment cardboard sheet 118 comprises a plurality of perforations that facilitate the complete or partial removal of the sections of cardboard in the region to facilitate access to any latch hardware that may be installed on the door. The plurality of vertical and horizontal perforations include a first elongated vertical perforation line 148 that in some variations extends about 22"-30" in length (most preferably about 26" in length) and spans the bottom and middle sections of the cardboard sheet 118. The first vertical perforation line is typically located about 4"-6" from the proximate vertical edge of the sheet. A second elongated vertical perforation line 160 of similar length as the first is located between vertical edge and the first elongated vertical perforation line. In one preferred variation, the first vertical line of perforation is located about five inches from the proximate vertical edge and the second vertical line of perforation is located about three inches from the proximate vertical edge. Both vertical lines of perforation are typically of equal length and parallel to each other.

Both lines of vertical perforations 148 & 160 intersect at their respective top ends with a top horizontal line of perforations 144. The top horizontal line of perforations is 4"-6" in length and extends from the vertical edge to a terminus at the top end of the first vertical line of perforations 148.

Similarly, both lines of vertical perforations 148 & 160 intersect at their respective bottom ends with a bottom horizontal line of perforations 164. The bottom horizontal line of perforations is 4-6" inches in length and extends from the vertical edge to a terminus at the bottom end of the first vertical line of perforations 148.

A plurality of intermediate horizontal lines of perforations 152 are evenly spaced and distributed between the top and bottom horizontal lines of perforations. In one preferred variation wherein the distance between the top and bottom horizontal lines of perforations is about 26" in length, twelve intermediate horizontal lines of perforations are provided spaced about 2.5" from the next nearest horizontal line of perforations.

The various horizontal and vertical lines of perforations form a plurality of rectangular sections within the door hardware access region, each of with can be removed or folded back either alone or in combination with other rectangular sections to provide access to door hardware when the protector 100 is installed upon an associated door.

As discussed above, variations of the first embodiment include adhesive edge tape 13 that can be utilized to secure the front and back panels to the door at the door's vertical edges. The fourth embodiment replaces the adhesive tape with strips of hook and loop material 113, thereby facilitating easier reuse and repositioning.

Figure 8:
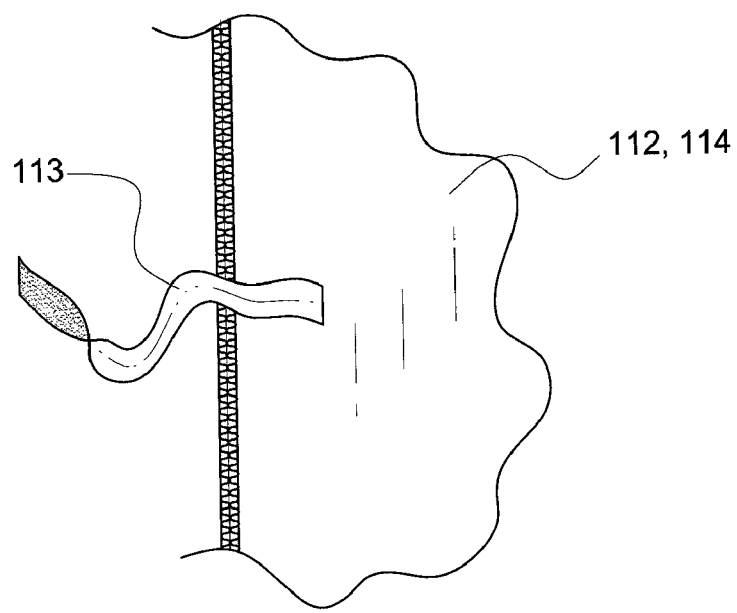
FIGS. 8 & 9 are partial isometric views of the door protective cover of FIG. 7 illustrating hook and loop straps and strips respectively according to the embodiment of the present invention.

In a preferred variation as illustrated in FIG. 8, each strap 113 has one of hook or loop material (typically loop material) on a substantial portion of the strap's door facing side. The straps are typically adhered at one end to an outside surface of a panel proximate the panel's vertical edges. Typically, the adhered ends are adhesively bonded to the panel although they may be mechanically fastened as well. On sides that include a removable elongated vertical sizing strip 140, similar to the removable strip 40 as illustrated in FIG. 2 and described with reference to the first embodiment door protector, the strap maybe adhered to the cardboard sheet 118 proximate the vertical line of perforations 138 along which the vertical sizing strip is torn to remove it for the protector's use on smaller doors.

Figure 9:
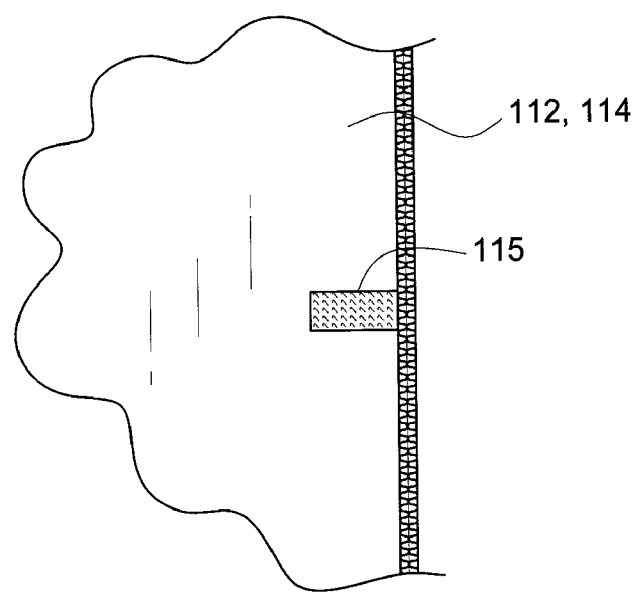

On the corresponding outside surface of the opposing panel as best shown in FIG. 9, strips 115 of hook or loop material (typically hook material) are adhered to the opposing panel proximate the panel's vertical edges at locations generally corresponding to the locations of the straps on the door protector's other panel. Accordingly, when installed on a door, each strap can be wrapped over the edge of the door and secured proximate its free end to a corresponding strip to tightly and securely hold the panels against the door 11 in a manner similar to that illustrated in FIG. 1 with edge tape 113 and as specifically illustrated in FIG. 11. On sides that include a removable elongated vertical sizing strip 140, similar to the removable strip 40 as illustrated in FIG. 2 and described with reference to the first embodiment door protector, the strap may be adhered to the cardboard sheet 118 proximate the vertical line of perforations 138 along which the vertical sizing strip is torn to remove it for the protector's use on smaller doors.

The number of straps and strips distributed along the vertical edges of the panels can vary. In one variation, a strap and corresponding strip are provided for each set of panel sections 124A-C as shown in FIG. 7. In another variation, straps and corresponding strips are provided on each of the vertical edges of the top and bottom sections 124A & 124C only. It is to be appreciated that straps and strips can be distributed in any suitable fashion on either of the front and back panels. For instance, a front panel may have a set of straps and a set of strips adhered to it and the back panel may include correspondingly located strips and straps. In other words, one panel need not have only straps secured thereto while the opposing panel need not have only strips secured to it.

Figure 10:
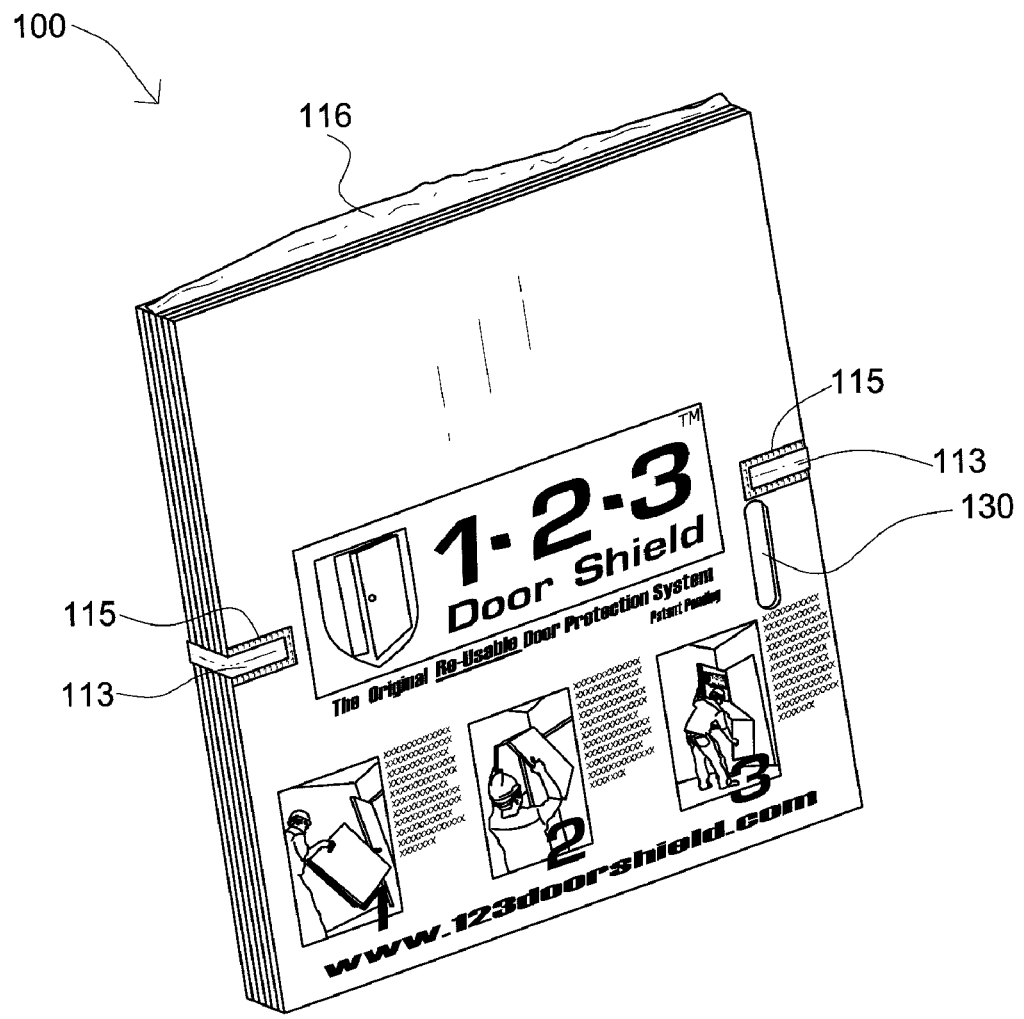
FIG. 10 is an isometric view of the door protective cover of FIG. 7 illustrating the cover in a folded configuration according to the embodiment of the present invention.
Figure 11:
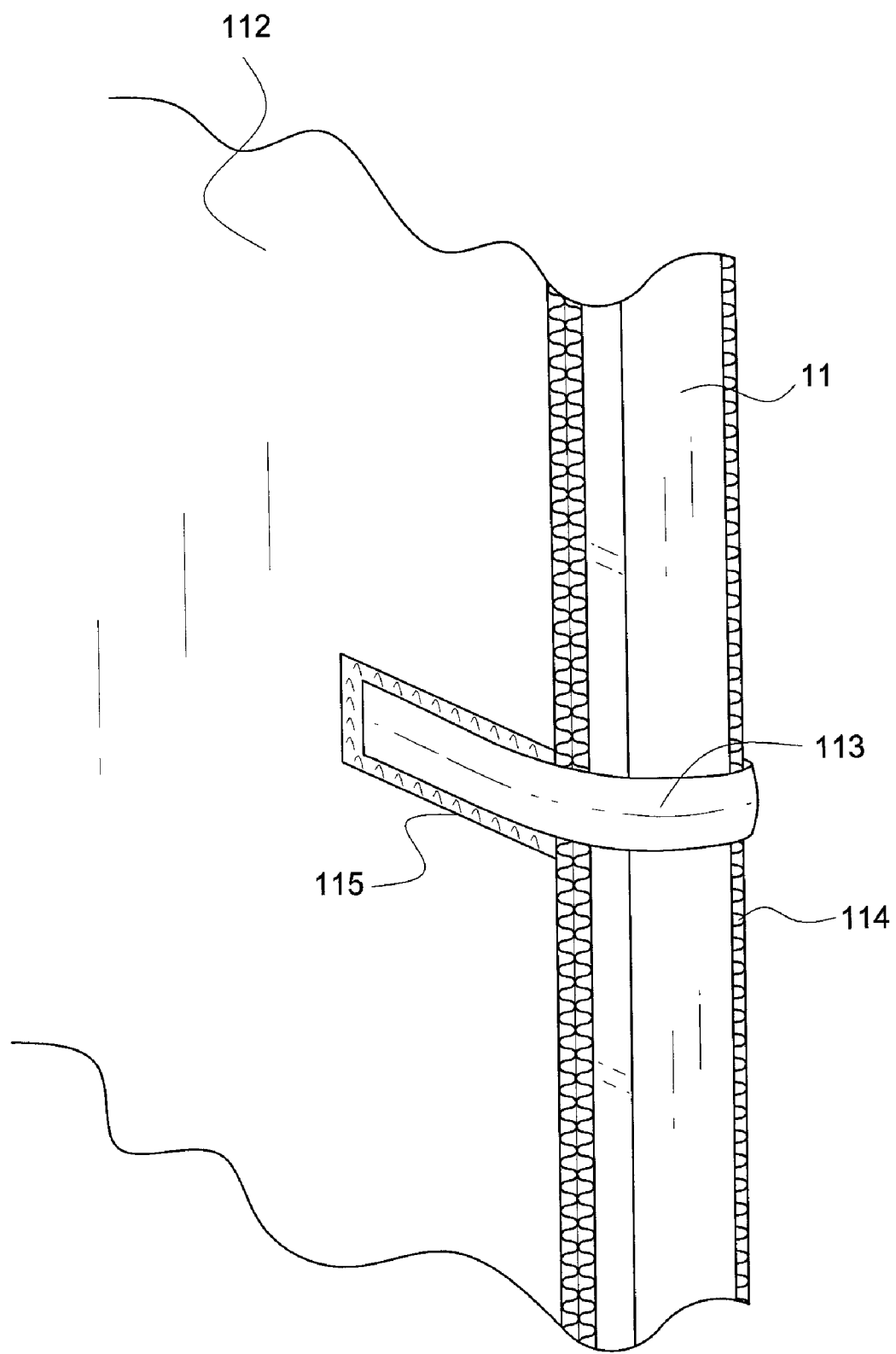
FIG. 11 is a partial view of the door protective cover of FIG. 7 installed on a door with a strap secured to a strip according to the embodiment of the present invention.

As illustrated in FIG. 10, the straps 113 in conjunction with corresponding strips 115 can also be utilized to secure the door protector 100 in its folded configuration for shipping and storage. Since the straps and strips are fixedly secured to the panels, there is little if any risk that the straps will become lost and as such are available when needed. Further, the risk of damaging the cardboard panels 118 by repeatedly taping and un-taping the panels 112 & 114 is significantly reduced thereby increasing the longevity of the product. As also illustrated in FIG. 10 and as shown in other Figures as well, handle knock outs 130 are provided that help facilitate carrying the door protector as well as help facilitate installation of the door protector by providing the user with a convenient means to lift and control the placement of the protector over the top of a door.

The two panels 112 & 114 are typically joined together with saddle tape 116 substantially similar to the saddle tape 16 described above with reference to the first embodiment; however, in certain variations the saddle tape made of a polymeric sheet material can be replaced with one or more hook and loop straps of a similar configuration as straps and strips used to secure the edges of the fourth embodiment door protector.

Referring primarily to FIG. 7, the indicia 134A-C provided on the door protector is preferably printed directly thereon; however, in other variations the indicia can be affixed by any suitable means. For instance, the indicia can be printed on a separate sheet of paper that is adhesively affixed to the outside surfaces of the panels. Typical indicia may include: identifying information 134A concerning the manufacturer of the door protector; contact information 134B for the manufacturer; and instructions 134B (graphical and/or written) concerning the products proper and intended use. Other suitable indicia may be provided as well as would be obvious to one of ordinary skill in the art given the benefit of this disclosure.

A Method of Protecting a Door Installed in a Doorway

Figure 12:
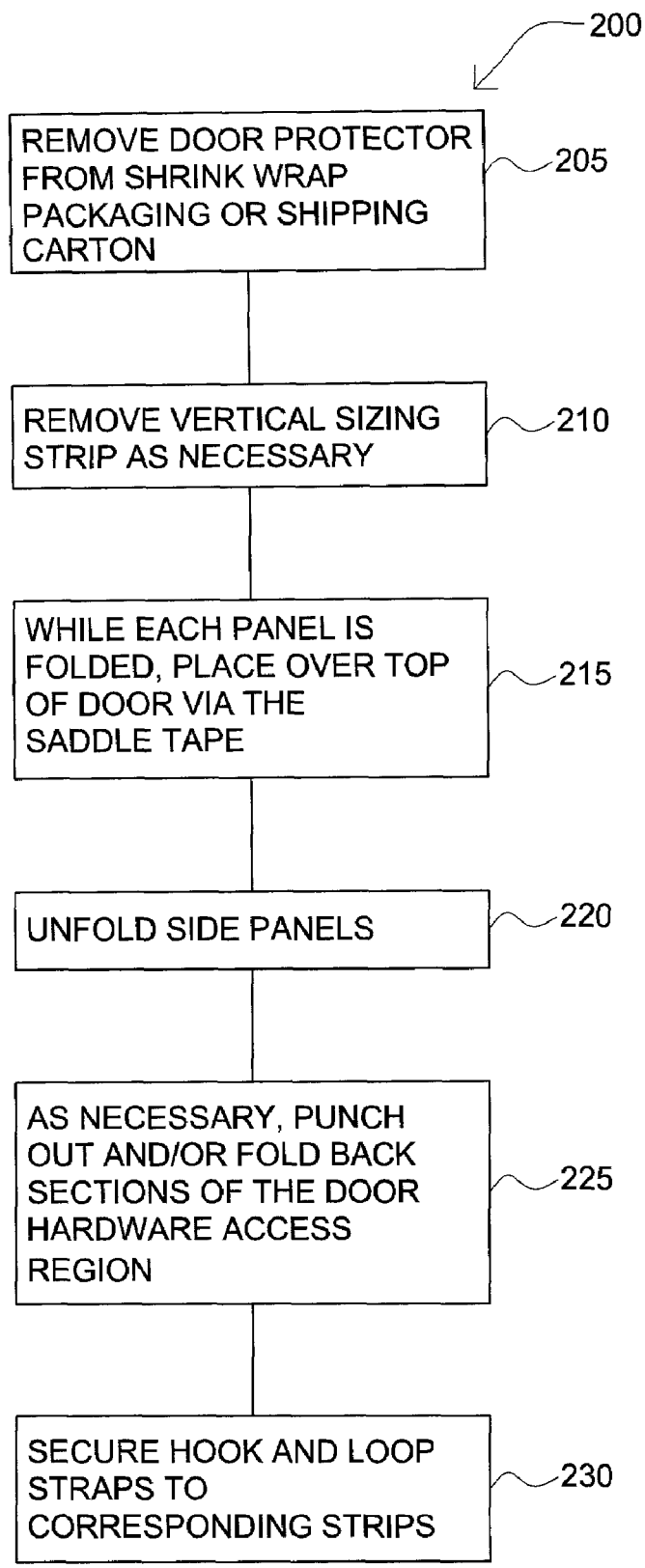
FIG. 12 is a flow chart showing a method of installing a door protective cover on a door according to an embodiment of the present invention.

FIG. 12 is a block diagram 200 illustrating the methodology of installing a fourth embodiment door protector on a door that is hanging in a doorway. It is appreciated, however, that a similar methodology can be utilized to install other embodiment door protectors on a door that has not been previously installed in a doorway.

When the door protector is used initially, it is removed from its packaging as indicated in block 205. At least one variation is shrink wrapped in its folded configuration. Other variations may not be wholly or partially enclosed in packaging as the hook and loop straps adhered to the protector effectively hold the unit in its compact folded configuration for shipping and storage.

If the door protector includes a vertical sizing strip as described above in relation to the first and fourth embodiments and the door which is to be covered is narrower than the door protector, the user can remove the vertical sizing strip or strip(s) as necessary by tearing it off along the provided and associated line(s) of perforations to reduce the width of the protector to be either essentially the same width as the door or slightly less wide than the door. In variations in which the sizing feature is not provided the user selects a door protector model having a suitable width relative to the width of the door.

In yet other variations, such as the fourth embodiment, the door protector panels may be manufactured with a sizing strip for convenience, but the strip may be removed by the manufacturer during the fabrication process prior to securing the hook and loop strips and straps to the protector. Accordingly, the hook or loop strip can be placed close to the edge of the edge protector when configured in its intended use width.

Next as indicated in block 215, the user typically lifts the door protector with the panels folded often using the provided handle knockouts upwardly sliding the saddle tape over the top edge of the associated door. The protector's panels are centered on the door.

The user then typically unstraps the hook and loop straps and unfolds the panels such that the panels cover substantially the entire surface of the door as indicated in block 220. It is appreciated that the protector's folded configuration as shown for instance in FIG. 4 facilitates the unfolding of the panels in such a manner that the non-abrasive inside surfaces of the panels are in contact with the exterior face surfaces of the door.

As necessary and as indicated in block 225, various sections of the door hardware access region are folded back, punched out or removed to permit access to the door's hardware, such as locks and door handles. The user may at his/her option remove the necessary sections prior to lifting the protector on to the door if he/she so desires. Further, if the protector is being reused, some or all of the sections in the door hardware access region may have already been removed.

Once the panels are hanging generally flush against the door, the user typically secures the various hook and loop straps to the corresponding strips to secure the protector in place as indicated in block 230.

After installing the door protector the door is effectively protected against light to moderate impacts that might occur during construction in the surrounding interior space and/or moving furniture and other items through the doorway. When the associated construction, moving or other work has been completed the door protector is removed from the door by essentially reversing the process described above. The folded door protector can be secured using the hook and loop straps and strips and can be conveniently stored for future use.

A Fifth Embodiment Door Protector

Figure 13:
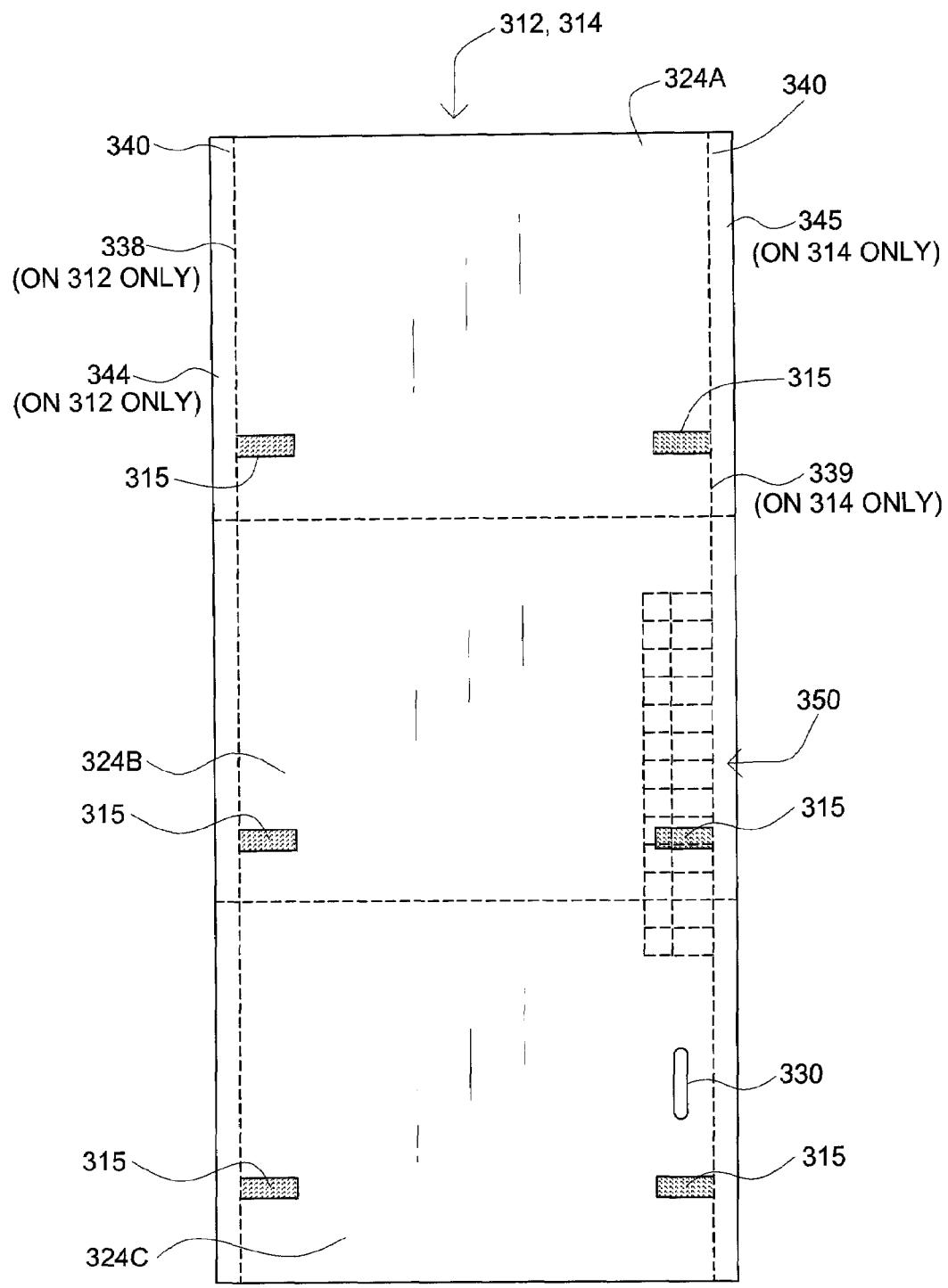
FIG. 13 is a front side view of a panel of a door protective cover according yet another embodiment of the present invention.
Figure 14:
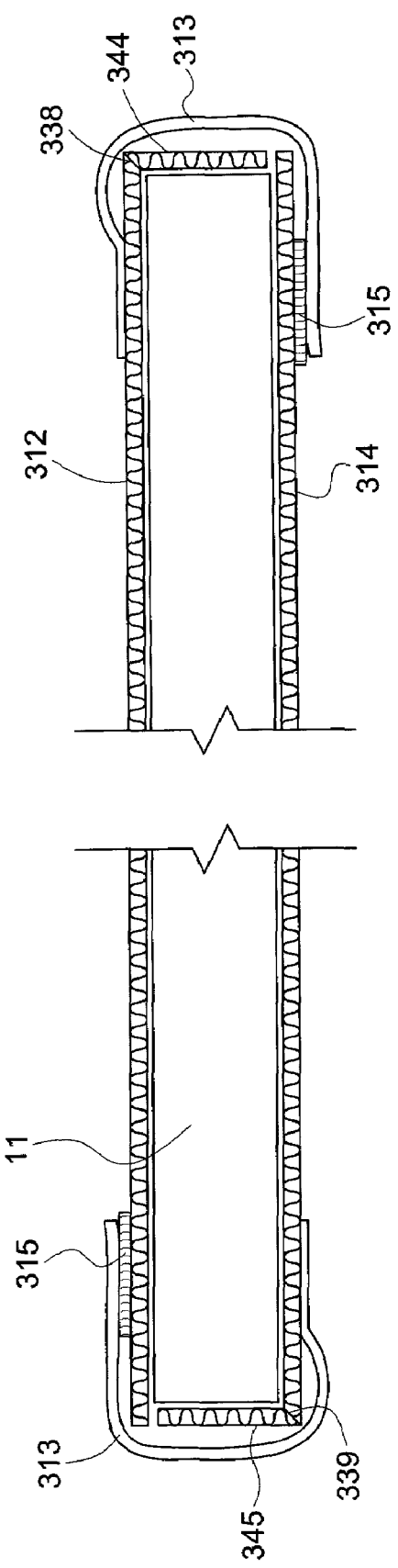
FIG. 14 is a cutaway end view of the door protective cover of claim 13 installed on a door according the embodiment of the present invention.

FIGS. 13 & 14 illustrate a low cost embodiment of the door protector primarily designed for use when transporting doors from one location to another, such as from a door's point of manufacture to a building site. Several cost saving modifications to the door protector embodiments described above are implemented to produce a lower cost variation. First, a corrugated cardboard material that only has a single layer of corrugation sandwiched between two outer linerboards is used in place of the two layers of corrugation used in most variations of the above mentioned embodiments. Further, the interior faces of the front and rear panels do not typically include a non-abrasive material or coating, such as the Nomar™ coated liner board. Accordingly, this low cost variation does not typically provide the same protection against fine scratches on finished doors; however, the corrugated cardboard does still provide good impact protection. However, many doors as manufactured are unfinished or have matt finishes so there is little concern over marring the finish.

Perhaps the biggest difference between the fifth embodiment door protector and the previous embodiments is the configuration of the vertical sides of each panel 312, 314 that include fold over portions 344 & 340 that can cover the door's vertical edge for enhanced protection during shipment. Further, the fold over portions can be torn away when the associated door 11 is installed in a door frame while the remainder of the protector remains in place and functions in much the same manner as the embodiments described above.

A single vertical lines of perforations 338 or 339 are provided proximate a vertical edge of each panel 312, 314 of the fifth embodiment. The line of perforations are located proximate the left side of each panel: on one panel 314 the line of perforations 339 are located along edge of the panel adjacent a door access region 350; and on the other panel 312 the line of perforations 338 are located on the opposite edge relative to the door access region. FIG. 13 is a composite of both panels 312 & 314, showing where each of the lines of perforations would be located relative to the door access region of each panel. Either line of perforations 338 or 339 is located approximately 1.0" from the corresponding edge of the panel and is adapted to fold such that a fold over portion 344 or 345 of the panel between the line and the respective panel's vertical edge can be folded over the edge of an associated door 11 as best illustrated in FIG. 14. Together when the fold over portions from each panel are folded over, the vertical edges are effectively protected. Once the door is delivered and hung the fold over portions 344 and 345 can be removed to expose the edges of the door and allow operational use of the door (i.e. opening, closing, latching and locking). It is appreciated that because the low cost fifth embodiment is typically comprised of a single layer of corrugated cardboard opposed to the two layers of the first and fourth embodiments, the thickness of the protector is accordingly reduced and as such the portions of the protector that cover the front and rear surfaces of the door typically do not interfere with the closing of the door in a door frame. In other words, the fifth embodiment door protector can cover substantially the entire front and back surfaces of a door and still allow the door to be fully operational; whereas, the first and forth embodiments often require the width of the protector to be an inch or so less than that of the door so that the thickness of the door protector panels these door protector embodiments do not interfere with the closing of an associated door frame.

Other than the aforementioned differences, the fifth embodiment is substantially similar to the fourth embodiment. It utilizes hook and loop straps and strips 313 & 315 to the hold protector against a door or in its folded configuration; although in some variations an additional set of strips and straps may be provided as shown in FIG. 3. A similar door hardware access region 350 is provided as door hardware access region 150 of the fourth embodiment. Each panel is divided into three sections 324A-C for folding similarly to sections 124A-C of the fourth embodiment. A handle knockout 330 may be provided on each bottom section 324C of each panel as similarly provided on the fourth embodiment.

Alternative Embodiments and Other Variations

The various embodiments and variations thereof illustrated in the accompanying Figures and/or described above are merely exemplary and are not meant to limit the scope of the invention. It is to be appreciated that numerous variations of the invention have been contemplated as would be obvious to one of ordinary skill in the art with the benefit of this disclosure.

For instance, the first and second embodiments make use of cardboard as the primary panel material. It is to be appreciated that variations can make use of other suitable materials such as but not limited to: (i) foam board; (ii) corrugated plastic sheet material; (iii) cardboard or plastic sheet material having a honeycomb type core; and (iv) wood-based fiberboard. In other embodiments sharing some characteristics of the third embodiment may comprise separate pieces of foam sheet that are laminated to plastic face sheet(s) wherein the fold lines comprise gaps in the aforementioned pieces of foam.

As mentioned above, the type of foam can vary significantly among variations as can its thickness and configuration. For instance vertical or horizontal strips can be utilized instead of three rectangular sheet pieces. Further, the configuration of slits, perforations, knifes, nicks and folds can vary substantially and significantly from the exemplary embodiments as illustrated.

We claim:
1. A method comprising:
providing a door protector in a folded configuration wherein the width of the door protector in the folded configuration is proximate the width of a typical door, the door protector is adapted to cover and the height of the folded door protector is about $\frac{1}{3}^{rd}$ or less the height of the typical door, the door protector comprising (i) a front panel at least partially comprising a corrugated cardboard material, the front panel having one or more widthwise front panel folds extending substantially from a first front panel lengthwise edge to an opposing second front panel lengthwise edge, (ii) a back panel at least partially comprising a corrugated cardboard material, the back panel having one or more widthwise back panel folds extending substantially from a first back panel lengthwise edge to an opposing second back panel lengthwise edge, (iii) a one or more saddle elements, the saddle elements being adapted to couple the front and rear panels together proximate a first front panel widthwise edge and a first back panel widthwise edge wherein the protective door cover is adapted to fold to a storage/shipping configuration having a length corresponding to the aforementioned lengthwise edges of the front and back panels that is about 33% or less than the length of the lengthwise edges, (iv) a plurality of elongated straps fixedly secured to one or both of the front and back panels proximate each respective panel's lengthwise edges, the straps being comprised of one of hook material or loop material, and (v) a plurality of strips fixedly secured to one or both the front and back panels proximate each respective panel's lengthwise edges at locations corresponding to locations of elongated straps on the other panel, the strips being comprised of the other of hook material and loop material, each strip being adapted to removably secure a corresponding strap thereto;

unfolding the door protector, wherein the door protector has a height proximate the height of the typical door in its unfolded configuration;

hanging the door protector over a top edge of the door by way of the one or more saddle elements;

securing the front and back panels together on the door along their lengthwise edges by way of the strips and straps; and closing the door with the door protector hung on the door.

2. The method of claim 1, wherein the door protector further comprises a plurality of folds and die cuts including a vertically expending line of die cuts proximate an edge of each of the front and back panels thereby forming a vertical strip bounded by a lengthwise edge of the panel and the vertically extending line and the method further comprises:

removing the vertical strip on one or both front and back panels by tearing or breaking off the strip off of the remainder of the associated panel along the vertically extending line to adjust the width of the panel relative to a width of the door.

3. The method of claim 1 wherein said hanging the door protector over a top edge of the door by way of the one or more saddle elements includes lifting the door protector over the top edge while holding the door protector by way of two handle knockouts wherein one handle knockout is provided on each of the front and back panels.

4. The method of claim 1, further comprising:
removing the door protector from the door;
folding the door protector to a length about 33% or less than the length of the lengthwise edges; and
securing the door protector in its storage/shipping configuration using the strips and straps.

5. The method of claim 2 wherein said hanging the door protector over a top edge of the door by way of the one or more saddle elements includes lifting the door protector over the top edge while holding the door protector by way of two handle knockouts wherein one handle knockout is provided on each of the front and back panels.

6. The method of claim 2, further comprising:
removing the door protector from the door;
folding the door protector to a length about 33% or less than the length of the lengthwise edges; and
securing the door protector in its storage/shipping configuration using the strips and straps.

7. The method of claim 3, further comprising:
removing the door protector from the door;
folding the door protector to a length about 33% or less than the length of the lengthwise edges; and
securing the door protector in its storage/shipping configuration using the strips and straps.

8. The method of claim 5, further comprising:
removing the door protector from the door;
folding the door protector to a length about 33% or less than the length of the lengthwise edges; and
securing the door protector in its storage/shipping configuration using the strips and straps.

9. The method of claim 1, wherein the door protector further includes one or more slots located on one or both of the front and back panels, the one or more slots being adapted to receive a user's hand therein to help facilitate installation of the door protector on a door.

10. The method of claim 1, wherein the front and back panels of the door protector each include at least one exposed sheet of liner board coated with an abrasion resistant coating.

11. The method of claim 1, wherein the one or more saddle elements comprise one or more pieces of thin flexible plastic sheet material, each piece of thin flexible plastic sheet material being adhesively coupled to both the front and rear panels and each piece of thin flexible plastic sheet material including a center portion being substantially free of adhesive.

12. The method of claim 1, wherein each panel of the front and back panels include a plurality of die cuts adapted to permit portions of each panel abutting one or more die cuts of the plurality of die cuts to be moved or removed relative to a remainder of each panel.

13. The method of claim 1 wherein one or both of the front and back panels further comprise a front liner board, a rear liner board and one corrugation sheet sandwiched therebetween.

14. The method of claim 1 wherein one or both of the front and back panels further comprise a front liner board, a rear liner board, a middle liner board and two corrugation sheets, one sandwiched between the front and middle liner boards and the other sandwiched between the rear and middle liner boards.

* * * * *